Figure 1:
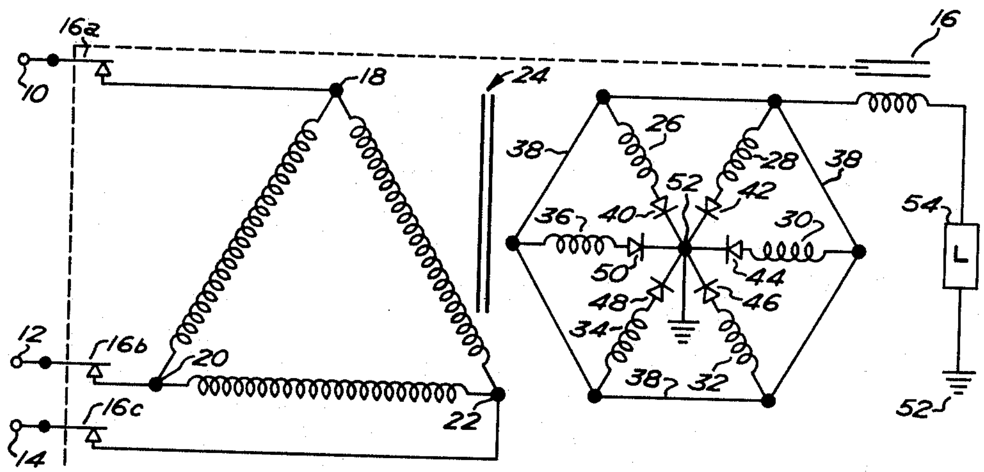

July 6, 1965 J. G. ELLSWORTH 3,193,752

PROTECTIVE ARRANGEMENT FOR POWER SUPPLY APPARATUS

Filed March 27, 1961

INVENTOR.
JAMES G. ELLSWORTH
BY
Thomas J. Nikolai
AGENT

United States Patent Office 3,193,752
Patented July 6, 1965

3,193,752

PROTECTIVE ARRANGEMENT FOR POWER SUPPLY APPARATUS

James G. Ellsworth, St. Paul, Minn., assignor to Sperry Rand Corporation, New York, N.Y., a corporation of Delaware Filed Mar. 27, 1961, Ser. No. 98,376
3 Claims. (Cl. 321—12)

This invention relates generally to protective arrangements for electrical power supply systems, and it has particular relation to an arrangement for detecting the presence of faults in electrical systems.

When it is desired to supply direct current to a utilization device or load from a multiphase alternating current supply, it has been found convenient to employ a multiphase transformer or a plurality of single phase transformers with rectifier means connected in the secondary windings thereof. When this expedient is employed, it has been found necessary to provide a protection circuit which will disconnect the alternating current supply from the primary windings of the transformer in the event that there is a fault or failure in the load circuit. For example, if the load circuit were accidentally shorted-out and there is no protection circuit employed, there is a danger that the excessive currents which would flow, would damage the secondary windings of the transformer to which the load is connected. In the prior art there are various schemes for connecting a current-responsive device such as a relay or circuit breaker in series with the load, so that in the event of a fault the relay coil becomes sufficiently energized so that its contacts are operated. The contacts for this relay may conveniently be located in the primary circuit of the power supply transformer such that when the relay is energized, the alternating current supply is disconnected from the primary windings of the transformer.

Another fault which may cause an overload condition in the secondary circuit of such a power supply is a rectifier failure. Should one of the rectifying devices located in the secondary windings fail shorted, an abnormally high current flows in the secondary windings of the transformer but not in the load. Therefore, the relay or circuit breaker located in series with the load would fail to detect this fault and it is possible that the power supply transformer would be ruined.

It is therefore a primary object of the invention to provide an improved protective arrangement for electrical systems.

It is another object of the present invention to provide in conjunction with a polyphase alternating current to direct current power supply, means whereby the fault occurring anywhere in the system will operate a protection circuit to prevent damage to the system.

Another object of my invention is to provide a novel arrangement in a multiphase alternating current to direct current power supply, whereby a fault occurring in the load or in the rectifiers employed therein will not cause damage to the system.

Figure 2:
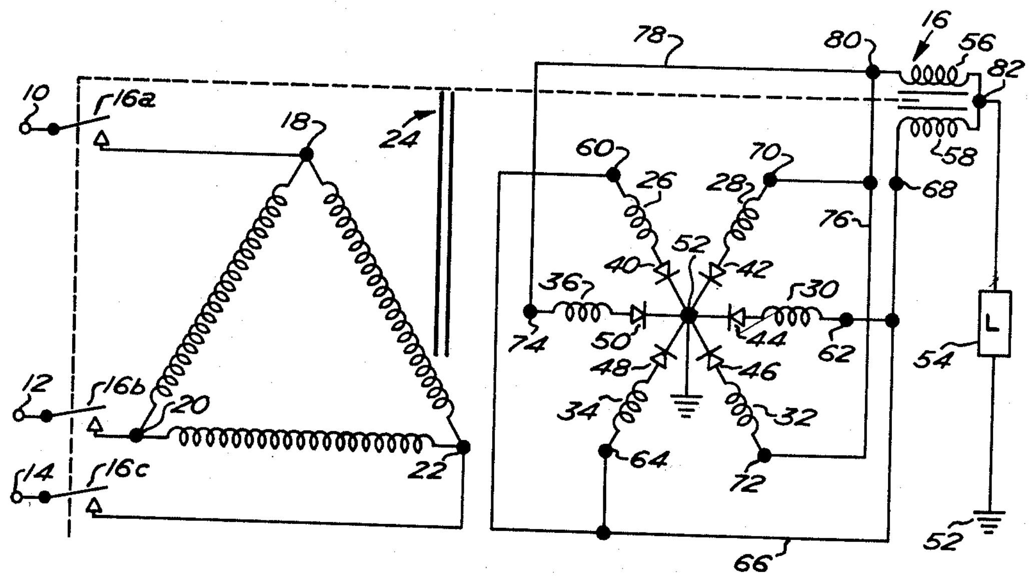

Other objects of the invention will be apparent from the following description taken in conjunction with the accompanying drawings, in which:

FIGURE 1 illustrates a typical prior art protection arrangement for a multiphase alternating current to direct current power supply, and FIGURE 2 is a schematic diagram illustrating the circuit arrangement in accordance with the teachings of the present invention.

Referring first to FIGURE 1, in which is shown a circuit for supplying direct current to a load from a multiphase alternating current source, there is provided a plurality of terminals, 10, 12 and 14, which are adapted to be connected to a suitable source of multiphase alternating current. These terminals are connected through the relay contacts 16*a*, 16*b* and 16*c* to the primary winding terminals 18, 20 and 22 of a multiphase transformer indicated generally by the numeral 24. Transformer 24 is illustrated as being a three-phase transformer having its primary windings arranged in a delta-connection and its secondary windings 26 through 36 connected in the star configuration. It is obvious, however, that three single phase transformers may be connected in this arrangement and limitation to a single three-phase transformer is not intended. Each of the secondary windings has a first terminal thereof connected in common with the corresponding terminals of the other secondary windings by means of a conductor 38, and has rectifying means 40 through 50 connected in series therewith to a point of fixed potential such as the grounded terminal 52. Connected in parallel relationship with each of the secondary windings and its associated rectifying means is a series circuit comprising a current responsive device 16, which may be a relay or other type circuit breaker, and a load or utilization device 54. The circuit breaker 16 controls its associated contacts 16*a*, 16*b* and 16*c* located in the feeder lines to the power supply transformer.

When source of three-phase voltage is connected to the input terminals 10, 12 and 14, corresponding voltages will be induced in the secondary windings 26 through 36. In the six-phase star connection, the voltages induced in opposite windings are 180° out of the phase. For example, when the voltage induced in secondary winding 26 is a maximum, the voltage induced in the opposite winding 32 will be a minimum. Also, the voltages induced in adjacent windings differ in phase by 60°. As a result, each of the rectifiers 40 through 50 is rendered conductive for approximately 60° or one-sixth of a cycle during each cycle of the input voltage. Since the series circuit comprising the individual secondary windings and associated rectifier are connected in parallel with the series combination of the load 54 and the circuit breaker 16, a direct current which has a ripple frequency of six times the input frequency flows through the load.

It is obvious from the circuit of FIGURE 1 that if the load 54 should be accidentally shorted, an abnormally high current would flow through the circuit breaker 16 to thereby operate the contacts 16*a* through 16*c* located in the primary circuit of the transformer 24 so as to disconnect it from the supply terminals 10, 12 and 14.

As mentioned previously, in the prior art circuit of FIGURE 1 under normal operation, current flows through a given rectifier 40 for a time period equivalent to 60°, and then 180° later current flows through the rectifier 46 associated with the opposite winding for a time period equivalent to 60°. The same holds true for the other rectifiers located in series with the opposite phase windings 28 and 48, and 30 and 36. It can be seen then, that if one of the rectifiers, for example, rectifier 40, becomes shorted and the time arrives during which the diode 46 is conductive, twice the normal voltage will be applied to the rectifier 46 in the forward direction, to thereby set up a large current flow through this rectifier and the two secondary coils 26 and 32. It should be noted that the current path in this situation does not include the load or the circuit breaker coil. It is therefore possible that this large current will burn out the transformer windings 26 and 32, or else cause the rectifier 46 to open.

The power supply circuit illustrated in FIGURE 2 of the drawings illustrates the preferred embodiment of the present invention. A comparison of this circuit with the circuit of FIGURE 1 immediately shows that no additional hardware is required but yet, as will be described more fully hereinbelow, the current responsive device 16 not only responds to the shorting out of the load but also to a shorted rectifier. Since the circuits of FIGURES 1 and 2 are substantially similar, like components are identified by the same numerals in both drawings.

While the primary windings and the connections thereto remain unchanged in the preferred embodiment, a change is made in the manner in which the secondary windings of the transformer 24 are connected into the load circuit comprising the circuit breaker 16 and the load 54. More specifically, the first terminal of each of the secondary windings 26 through 36 are no longer connected in common to one side of the circuit breaker 16 as in the prior art arrangement, but are arranged such that the first terminal of alternate secondary coils are connected in common to the opposite ends of the circuit breaker windings 56 and 58. That is, the terminals 60, 62 and 64 of secondary coils 26, 30 and 34, respectively, are connected in common by means of a conductor 66 to a first terminal 68 of the circuit breaker 16. Similarly, the terminals 70, 72 and 74 of the secondary windings 28, 32 and 36, respectively, are connected in common by means of the conductors 76 and 78 to the other terminal 80 of the winding 56 on circuit breaker 16. In the preferred embodiment of the invention, the circuit breaker 16 is of the type having a split winding with the load 54 being connected between the grounded terminal 52 and the center tap terminal 82 of the split winding circuit breaker 16.

In operation, when the terminals 10, 12 and 14 are connected to a source of multiphase alternating current, voltages are induced in each of the secondary windings 26 through 36. As before, the voltages induced in adjacent windings differ in phase by 60° and the voltage induced in the winding opposite to the one in question is out of phase by 180°. The rectifiers 40 through 50 operate on these induced voltages so as to produce a direct current having a ripple frequency six times the frequency of the applied voltage. It can be seen from FIGURE 2 that during the time in which the rectifiers 42, 46 and 50 are rendered conductive, the current flows from the grounded neutral terminal 52 upwards through the load 54 and through the winding half 56 of the split winding circuit breaker 16 to the junction point 80. Depending on which of the above-mentioned rectifiers are conductive, the current either flows from junction 80 through conductor 76 or through the conductor 78 back to the secondary winding associated with the conductive rectifier. In the same manner, at the particular time in the cycle during which either rectifier 44, 48 or 40 is rendered conductive, the current flow is from the grounded neutral terminal 52 and upwards through the load 54 and then through the winding half 58 of the split winding circuit breaker 16 to the junction 68. From the junction 68 the current then flows through the conductor 66 back to the outer terminal of the particular secondary winding having a sufficient voltage induced therein to cause its associated rectifier to be the conductive one of the group.

If, by accident, the load should be shorted-out, there would be a substantial increase in the amount of current flowing through either the winding half 56 or 58 to thereby energize the circuit breaker and operate its associated contacts *16a*, *16b* and *16c* to disconnect the supply from the primary side of the transformer.

Because of the novel manner in which the circuit breaker 16 is connected into the power supply circuit, a short across any one or more of the rectifiers 40 through 50 also causes a substantial increase in the amount of current flowing through it. Assuming, for example, that the diode 44 fails shorted, at the time in the cycle at which the diode 50 is rendered conductive, twice the normal voltage will be applied to the diode 50 in the forward direction to thereby set up an excessive current flow through the diode 50 through the secondary winding 30, the conductor 66, the windings 58 and 56, and through the conductor 78 to the terminal 74 on secondary winding 36. As before, this increased current is effective to operate the circuit breaker 16 so as to disconnect the power supply transformer from the feeder lines.

It can be seen, therefore, that the various objects and advantages provided by this system as herein set forth are successfully achieved.

While I have shown a particular embodiment of my invention, it will be understood, of course, that I do not wish to be limited thereto, since many modifications may be made and I therefore contemplate by the appended claims to cover any such modifications as fall within the true spirit and scope of my invention.

What I claim is new and desire to secure by Letters Patent of the United States is:

1. In a multiphase alternating current to direct current power supply, the combination comprising: a plurality of single phase transformers each having a primary winding and at least two secondary windings, said primary windings being connected to a source of multiphase alternating current; a plurality of rectifier means each having a first electrode connected to a point of fixed potential and a second electrode connected to a first terminal of respective ones of said secondary windings; a relay having a first, second and a center tap terminal; means connecting the second terminal of alternate ones of said secondary windings in common to said first and second terminals of said relay; load means; and means connecting said load means between said point of fixed potential and the center tap terminal of said relay coil, the arrangement being such that said relay is operated when either one or more of said rectifiers or said load fails shorted.

2. In a multiphase alternating current to direct current power supply, the combination comprising: a multiphase transformer having a primary winding means and secondary winding means, said primary winding means being connected to a source of multiphase alternating current; a plurality of rectifier means each having a first electrode connected to a point of fixed potential and a second electrode connected to a first terminal of respective ones of said secondary winding means; relay means having first, second, and center tap terminals; means connecting a second terminal of alternate ones of said secondary windings in common to said first and second relay terminals; load means; and means connecting said load means between said point of fixed potential and said center tap terminal of said relay coil, the arrangement being such that said relay is operated to disconnect said primary winding means from said source of alternating current when either one or more of said rectifier means or said load means fails shorted.

3. In an alternating current to direct current power supply, the combination comprising: transformer means having primary and secondary winding means, said primary winding means being connected to a source of alternating current; a plurality of rectifiers each having a first electrode connected to a point of fixed potential and a second electrode connected to a first terminal of respective ones of said secondary winding means; current responsive means having first, second and center tap terminals; means connecting a second terminal of certain secondary winding means in common to said first terminals of said current responsive means; and means connecting other of said second terminals of said secondary winding means in common to said second terminal of said current responsive means; load means; and means connecting said load means between said point of fixed potential and said center tap terminal, such that said current responsive means is rendered operative upon the failure of either said load means or one or more of said plurality of rectifier means.

References Cited by the Examiner

UNITED STATES PATENTS

| | | | |
|---|---|---|---|
| 2,354,158 | 7/44 | Taliaferro | 321—12 |
| 2,733,399 | 1/56 | Derr et al. | 321—14 |

FOREIGN PATENTS

| | | |
|---|---|---|
| 125,815 | 3/28 | Switzerland. |
| 512,247 | 8/39 | Great Britain. |

LLOYD McCOLLUM, *Primary Examiner.*

SAMUEL BERNSTEIN, *Examiner.*